United States Patent
Zisimopoulos et al.

(10) Patent No.: US 8,064,382 B2
(45) Date of Patent: Nov. 22, 2011

(54) APPARATUS AND METHOD FOR SCHEDULING IN A WIRELESS COMMUNICATION SYSTEM

(75) Inventors: Haris Zisimopoulos, Reading (GB); Chandrika Worrall, Newbury (GB)

(73) Assignee: Wireless Technology Solutions LLC, New York, NY (US)

( * ) Notice: Subject to any disclaimer, the term of this patent is extended or adjusted under 35 U.S.C. 154(b) by 939 days.

(21) Appl. No.: 11/864,640

(22) Filed: Sep. 28, 2007

(65) Prior Publication Data
US 2009/0086705 A1  Apr. 2, 2009

(51) Int. Cl.
*H04B 7/212* (2006.01)
(52) U.S. Cl. ............... 370/322; 370/329; 370/348
(58) Field of Classification Search .......... 370/329–332, 370/233, 230, 468, 412, 347, 235.1; 455/436, 455/453, 452.2
See application file for complete search history.

(56) References Cited

U.S. PATENT DOCUMENTS
2009/0046642 A1* 2/2009 Damnjanovic ............... 370/329
2009/0168793 A1* 7/2009 Fox et al. ..................... 370/412

FOREIGN PATENT DOCUMENTS
WO  WO 2006/117251  11/2006

OTHER PUBLICATIONS

"MBR and AMBR enforcement in UL" 3GPP Draft: R2-070494, tsg_ran\WG2_RL2\TSGR2_57\Documents, Feb. 7, 2007.*
International Search Report Dated Feb. 25, 2009 from PCT/EP2008/062149.
"MBR and AMBR Enforcement in UL" 3GPP TSG RAN2 #57, St. Louis, USA Feb. 12-16, 2007.

* cited by examiner

*Primary Examiner* — Chi Pham
*Assistant Examiner* — Kouroush Mohebbi
(74) *Attorney, Agent, or Firm* — Fitch Even Tabin & Flannery

(57) ABSTRACT

A method of scheduling an uplink (UL) data packet on a packet data network (PDN) connection of at least one radio bearer by a wireless communication unit comprises receiving, by the wireless communication unit, a signalling message comprising at least one scheduling priority parameter assigned to at least one uplink radio bearer, wherein the at least one scheduling priority parameter is based on at least one characteristic of the PDN connection that the radio bearer belongs to. The method further comprises determining, from the at least one scheduling priority parameter, at least one user transmission priority level associated with at least one PDN connection of at least one radio bearer; and scheduling at least one uplink data packet transmission in response to the at least one user transmission priority level.

20 Claims, 7 Drawing Sheets

FIG. 1 - Prior Art
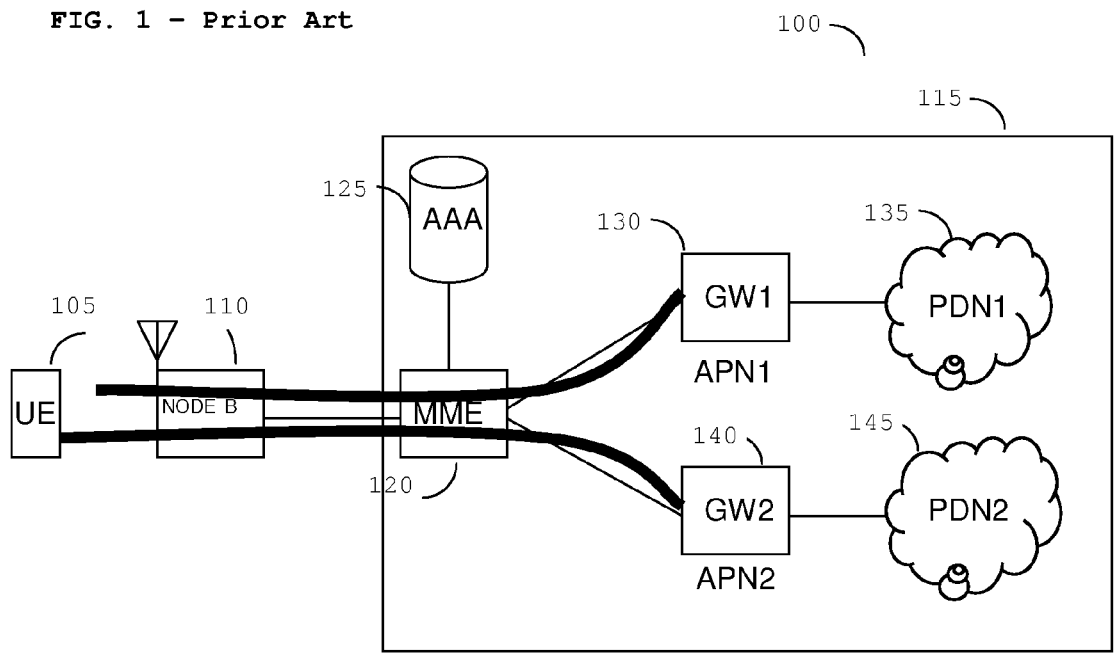
FIG. 2 - Prior Art
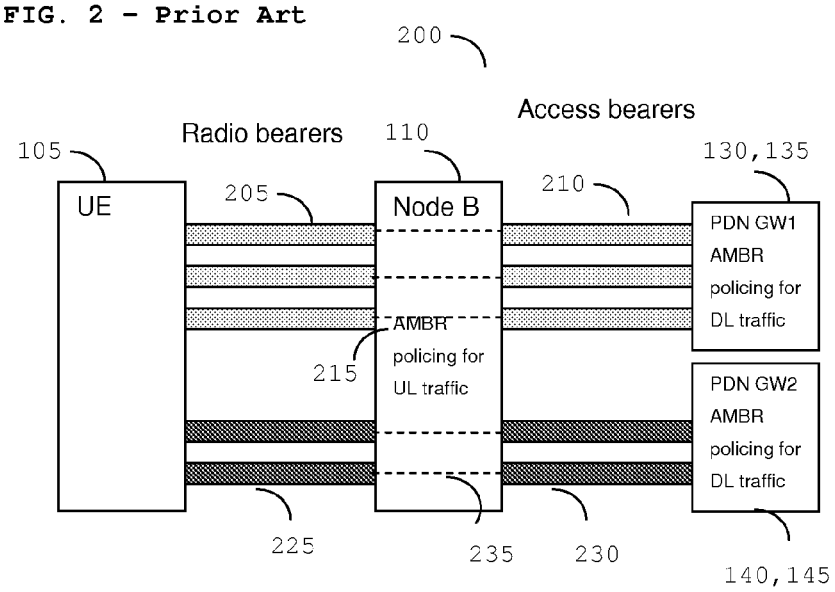

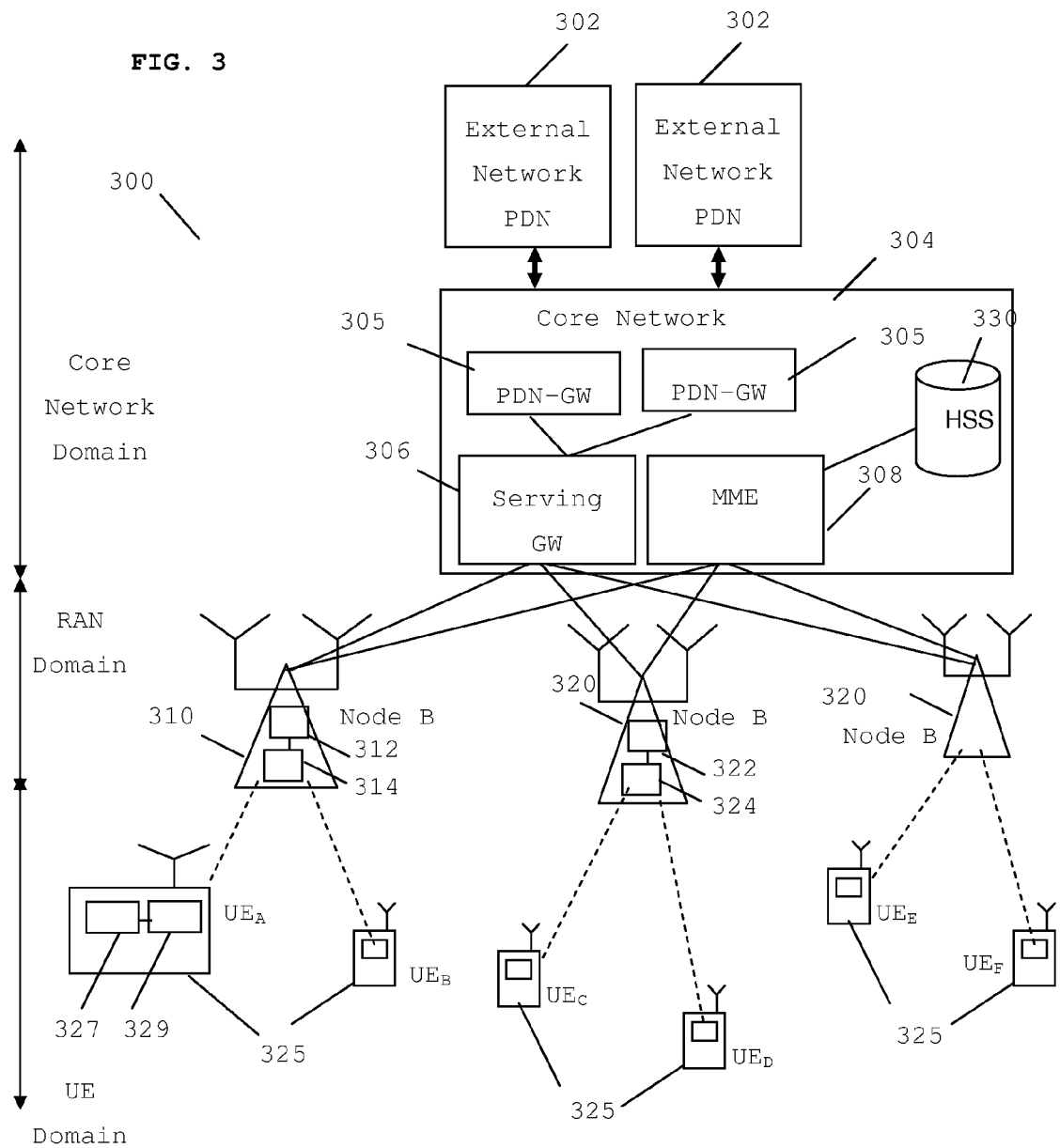

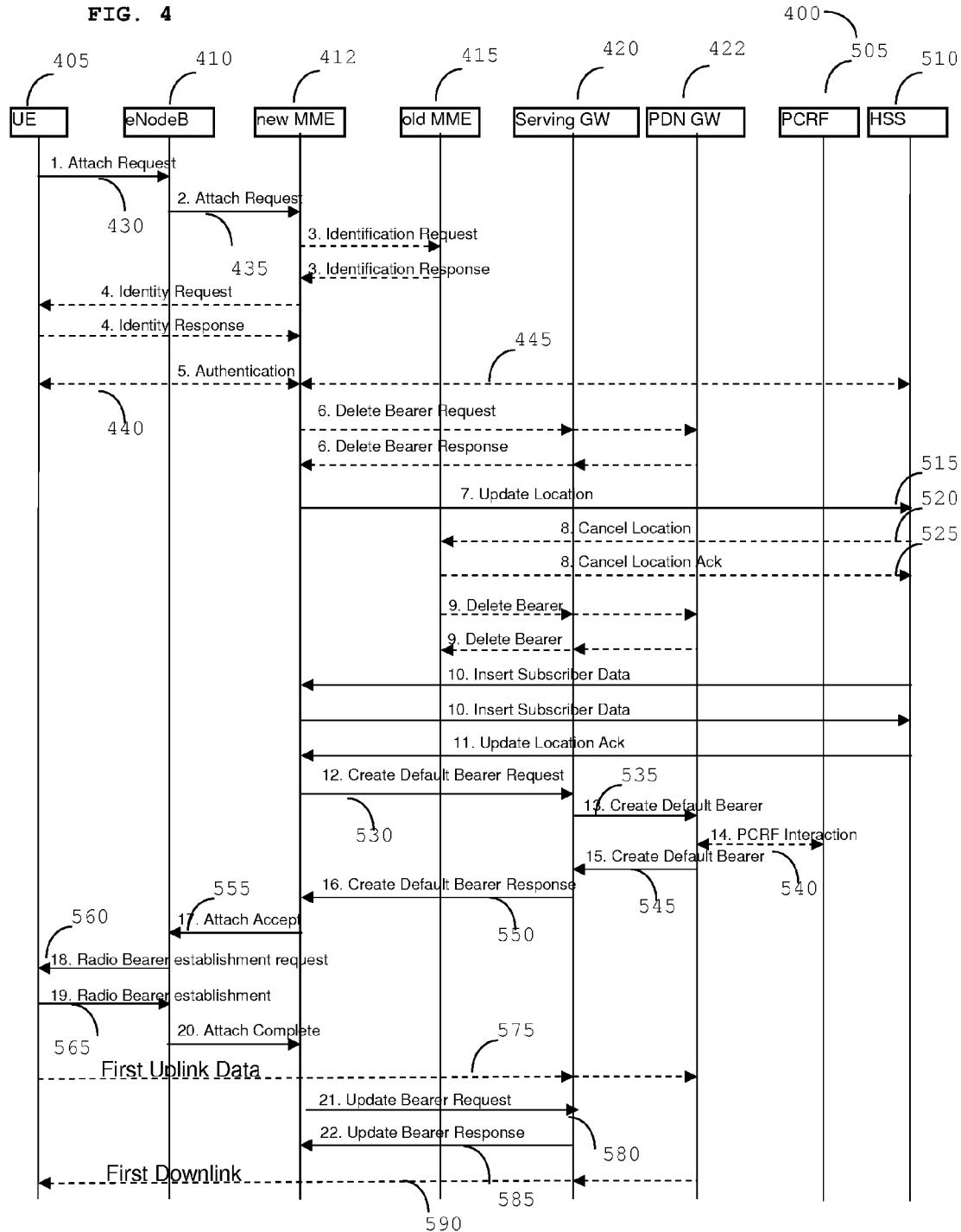

APPARATUS AND METHOD FOR SCHEDULING IN A WIRELESS COMMUNICATION SYSTEM

FIELD OF THE INVENTION

The invention relates to apparatus and methods for scheduling communications in a packet data network, such as a $3^{rd}$ Generation Partnership Project (3GPP) cellular communication system.

BACKGROUND OF THE INVENTION

Currently, 3rd generation cellular communication systems are being rolled out to further enhance the communication services provided to mobile phone users. The most widely adopted 3rd generation communication systems are based on Code Division Multiple Access (CDMA) and Frequency Division Duplex (FDD) or Time Division Duplex (TDD) technology. Further description of CDMA, and specifically of the Wideband CDMA (WCDMA) mode of UMTS, can be found in 'WCDMA for UMTS', Harri Holma (editor), Antti Toskala (Editor), Wiley & Sons, 2001, ISBN 0471486876.

In 3GPP systems, such as the General Packet Radio System (GPRS), Evolved Packet System (EPS), the downlink communication endpoint, namely the mobile or handheld wireless communication unit, referred to as user equipment (UE) in 3G parlance, may have multiple simultaneous connections to a number of network elements. Such network elements typically comprise gateways (GWs), such as General GPRS Support nodes (GGSNs), packet data network (PDN) GWs, etc., in order to obtain access to different packet data networks (PDNs) that facilitate the UE accessing a number of different services (for example facilitating access to corporate services as well as simultaneous access to the Internet).

In such systems, it is known that the amount of data being transferred between elements may be controlled by setting an aggregate maximum bit rate (AMBR), which is defined as an upper limit for non-guaranteed bit rate (GBR) communication bearers that are associated with a particular PDN connection that a UE has established.

FIG. 1 illustrates a known 3GPP system 100 that uses AMBR. The 3GPP system 100 comprises a UE 105 communicating with two independent PDNs, PDN-1 135 and PDN-2 145 via first and second access point (AP) nodes 130, 140 respectively, which are shown as GWs. The respective data streams to the PDNs are routed by a Mobility Management Entity (MME) 120, which is coupled to Authentication, Authorisation and Accounting (AAA) Server 125. The totality of these network elements is often referred to as a core network 115. A Node-B 110 routes the wireless transmission from the UE 105 to the MME 120 in the core network 115. In order to utilise an AMBR to limit a data amount sent to the respective PDNs, the AMBR needs to be enforced for each of the non-Guaranteed Bit Rate (GBR) bearers connecting the UE with a particular GW providing access to a specific PDN.

In 3GPP (see, for example, 3GPP TS 23.401, 'GPRS enhancements for E-UTRAN access'; Release 8) the AMBR is enforced in the NodeB 110 in 3GPP for the UpLink (UL) traffic and in the GW (for example, PDN-1 and PDN-2 GWs in 3GPP) for the respective DownLink (DL) traffic. This is a natural choice given that the NodeB and GWs are the traffic ingress points for the UL and DL traffic respectively. Furthermore, as radio resources are the most cost sensitive for a wireless Operator, it is not reasonable to 'pass through' UL traffic over an air-interface when the UL traffic will be later discarded.

Thus, the Node B 110 has to be informed of the PDN connections that the UE 105 has established at any time and be in a position to associate the radio bearer that it assigns scheduling priorities with the UE-PDN connection that it belongs to. In other words the Node B 110 has to take into account the AMBR value and its relationship with each UE-PDN connection to the UL scheduling decisions it makes (for example by assignment of a prioritized bit rate PBR). The Node-B 110 also controls the radio bearer establishment and management. According to the information received from the relevant Core Network (CN) 115 element, for example MME 120 in the 3GPP Evolved Packet System (EPS), the Node B 110 establishes the radio bearers for all the corresponding gateways (GW).

The characteristics of AMBR are somewhat different to other dynamic bearer parameters that are used in wireless and other communication systems to support a particular end-to-end quality of service (QoS), in the sense that:

(i) An AMBR value is applied to a 'bundle' of Non-GBR bearers, for a specific UE-PDN connection, and not each one individually. Therefore, AMBR values require a special treatment by the network element that is responsible to enforce and police the AMBR, particularly when this element is responsible to schedule resources that are dynamically changing (such as the Node-B); and (ii) The AMBR value is static subscriber information, stored in the subscriber database registry. Therefore, the AMBR value has to be communicated during the initial attach procedure, instead of being dynamically provided by the Policy Server as part of the bearer setup, in contrast to how the other dynamically changing QoS parameters are normally provided.

FIG. 2 illustrates a known radio bearer establishment mechanism between the UE 105 and the Node-B 110, and the AMBR policing performed in the UL and DL respectively. It is noteworthy that a one-to-one relationship between the radio bearer 205 that connects the UE 105 to the Node-B 110 and access bearer 210 that terminates the traffic to the PDN GW 130 is maintained at the radio bearer 205 establishment. At a given time, there may be more than one radio bearer 205 and access bearer 210 established to the UE 105 for the purposes of providing different Quality of Service (QoS) treatment to different user applications or classes of users. In the DL, the logical elements of the scheduler in the Node-B 110 schedules the DL traffic based on a particular Quality of Service (QoS) of the radio bearers 205 that has been indicated to it by some QoS identifier during the bearer establishment as well as traffic volume used in the respective radio bearers 205. The AMBR policing for the DL traffic is carried out at the respective PDN GW 130, 135, 140, 145, given this is where the 3GPP Policy and Charging Enforcement Function (PCEF) is typically located since the PDN GWs 130, 140 are the first ingress points of downlink (DL) traffic.

If an AMBR level is exceeded in the DL, for a particular PDN connection, the exceeding traffic for all the access (non-GBR) bearers 210 from this PDN GW may be rate limited by the 3GPP PCEF in the PDN GW, in order to conform to the specified AMBR that has been communicated to the PDN GW at the initial bearer establishment.

Thus, UL resource is assigned by the appropriate logical element of the scheduler in the Node-B 110 according to a traffic volume reported by the UE, and allocated on a per-UE basis. The scheduling of radio bearers 205 into the allocated grant is performed by the UE 105 using the logical function of the UL packet scheduler based on priorities that are communicated to it during the radio bearer establishment by the Node-B 110. In order to control the radio bearer scheduling by the UE 105, an UL rate control function that manages the sharing of UL resources between radio bearers has been specified in 3GPP. The scheduler in the Node-B 110 configures each radio bearer 205 with scheduling parameters, such as an absolute priority value and a Prioritised Bit Rate (PBR) value, based on the Quality of Service (QoS) parameters that are communicated by the core network (CN), such as the QoS label and the GBR value for the GBR bearers.

In addition, a maximum bit rate (MBR) may be optionally configured per radio bearer 205. The assigned priority value and the PBR (and optionally MBR) are signalled to the UE 105 together with the radio bearer configuration information. The priority value is set by the Node-B 110 based on the QoS information received from the Core Network (CN) 115. In this manner, the PBR sets an UL rate control limit at the UE that applies per radio bearer and ensures that the UE 105 serves its radio bearers 205 in decreasing priority order up to their PBR value.

If any resources remain available, all the radio bearers 205 are served in a strictly decreasing priority order, up to their MBR (if configured). In a case where no MBR is configured, the radio bearer 205 is served until either the data for that radio bearer 205 or the UL grant is exhausted, whichever occurs first. In general terms these parameters are the scheduling priority parameters that apply in the case of a 3GPP long-term evolution (LTE) wireless communication system.

However, the inventors have recognised and appreciated that the assignment of these scheduling parameters (for example PBR, priority and (optionally) MBR in a case of a 3GPP LTE wireless communication system) are not associated with the AMBR that applies to the entire UE-PDN connection that this radio bearer serves. This means, in effect, that if two bearers have the same QoS characteristics (for example, same QoS label) and even though they belong to two different PDN connections (for example one with high AMBR values and one with low AMBR values), both radio bearers will receive the same scheduling treatment given that the AMBR is not communicated to the Node-B.

Thus, this scenario is inefficient and wasteful of valuable resource. For example, if a radio bearer serves hyper text transfer protocol (HTTP) traffic from a virtual private network (VPN) with high AMBR and HTTP traffic from the Internet with a low AMBR, the same scheduling treatment at the Node-B 110 and the UE 105 will apply to both.

Consequently, current scheduling techniques are suboptimal. Hence, an improved mechanism to address the problem of handling AMBR over a cellular network would be advantageous.

SUMMARY OF THE INVENTION

Accordingly, the invention seeks to mitigate, alleviate or eliminate one or more of the abovementioned disadvantages singly or in any combination.

According to a first aspect of the invention, there is provided, a method of scheduling an uplink (UL) data packet on a packet data network (PDN) connection of at least one radio bearer by a wireless communication unit. The method comprises receiving, by the wireless communication unit, a signalling message comprising at least one scheduling priority parameter assigned to at least one uplink radio bearer, wherein the at least one scheduling priority parameter is based on at least one characteristic of the PDN connection that the radio bearer belongs to. The method further comprises determining, from the at least one scheduling priority parameter, at least one user transmission priority level associated with at least one PDN connection of at least one radio bearer; and scheduling at least one uplink data packet transmission in response to the at least one user transmission priority level.

Thus, embodiments of the invention may allow improved use of the communication resource by more efficiently utilising uplink resources in the communication system, by modifying the scheduler logic in the network element to assign a scheduling parameter relevant to a value of the UL AMBR that has to be enforced for radio bearers serving on a PDN connection. In this manner, a mechanism is employed that enables the network element to not admit uplink (UL) traffic, transmitted by the wireless communication unit, which would have to be dropped later because it exceeded the AMBR value. Hence, this mechanism allows a Network Operator to increase the number of users that can be supported by the system, whilst still being able to control the UL AMBR that is transmitted by the wireless communication units on a certain PDN connection.

According to an optional feature of the invention, the scheduling priority parameter comprises at least one of: at least one radio bearer priority, at least one uplink rate control weighting parameter, at least one maximum bit rate (MBR) and at least one absolute priority value related to the PDN connection.

In this manner, a mechanism to enforce the UL AMBR by the network element is provided, by assigning an appropriate scheduling priority parameter that would ensure that the required AMBR is respected by the wireless communication unit. The respected AMBR is valid for the entire PDN connection. In addition the mechanism prevents an unfair treatment of the radio bearer resource in special congestion situations, since an uplink rate control weighting parameter is assigned in each radio bearer.

According to a further optional feature of the invention, the at least one absolute priority value may be assigned to at least one of: a PDN connection, and an aggregate maximum bit rate (AMBR) value.

In this manner, a mechanism to enforce the UL AMBR by the network element is provided, by assigning the appropriate scheduling priority parameter that would ensure that the required AMBR is respected by the wireless communication unit for the entire PDN connection.

According to an optional feature of the invention, at least one user transmission priority level may be based on both the at least one radio bearer priority level and the at least one absolute priority value.

According to an optional feature of the invention, at least one uplink rate control weighting parameter may be associated per radio bearer of the wireless communication unit based on at least one AMBR level associated with the PDN connection.

In this manner, a mechanism to enforce the UL AMBR by the network element is provided, by assigning an appropriate scheduling priority parameter that would ensure that the required AMBR is respected by the wireless communication unit. The respected AMBR is valid for the entire PDN connection. In addition the mechanism prevents an unfair treatment of the radio bearer resource in special congestion situations, since an uplink rate control weighting parameter is assigned in each radio bearer.

According to an optional feature of the invention, the at least one aggregate maximum bit rate (AMBR) value may be received as a first scheduling parameter to the wireless communication unit before receiving at least one further scheduling parameter.

In this manner, the scheduling performed for the AMBR between the PDN connections that the network element serves may be separated from the scheduling of each individual radio bearer. This may facilitate a faster scheduling procedure in the network element.

According to an optional feature of the invention, the scheduling priority parameter may be received as part of an establishment of the at least one PDN connection of the wireless communication unit or as part of an establishment of a radio bearer per PDN connection of the wireless communication unit.

In this manner, the signaling message may be implemented within existing messages that establish at least one PDN connection.

According to an optional feature of the invention, at least one user transmission priority level may be associated with a plurality of individual radio bearers corresponding to the at least one PDN connection.

In one optional embodiment, the method may be applied to a $3^{rd}$ Generation Partnership Project (3GPP) cellular communication system. In one optional embodiment, the method may be applied to a 3GPP Evolved Packet System (EPS) architecture and/or a 3GPP Long Term Evolution (LTE) air interface architecture.

In one optional embodiment, the method may be applied to a WiMAX cellular communication system.

According to a second aspect of the invention, there is provided a wireless communication unit for scheduling an uplink (UL) data packet on a packet data network (PDN) connection of at least one radio bearer in a wireless communication system. The wireless communication unit comprises a receiver for receiving a signalling message comprising at least one scheduling priority parameter assigned to at least one uplink radio bearer, wherein the at least one scheduling priority parameter is based on at least one characteristic of the PDN connection that the radio bearer belongs to. The wireless communication unit further comprises logic for determining from the at least one scheduling priority parameter at least one user transmission priority level associated with at least one PDN connection of at least one radio bearer and scheduler logic for scheduling, by the wireless communication unit, at least one uplink data packet transmission in response to the at least one user transmission priority level.

According to a third aspect of the invention, there is provided a computer program product comprising program code for scheduling an uplink (UL) data packet on a packet data network (PDN) connection of at least one radio bearer in a wireless communication system. The computer program product comprises program code for receiving a signalling message comprising at least one scheduling priority parameter assigned to at least one uplink radio bearer, wherein the at least one scheduling priority parameter is based on at least one characteristic of the PDN connection that the radio bearer belongs to. The computer program product comprises further program code for determining from the at least one scheduling priority parameter at least one user transmission priority level associated with at least one PDN connection of at least one radio bearer; and scheduling at least one uplink data packet transmission in response to the at least one user transmission priority level.

According to a fourth aspect of the invention, there is provided a network element arranged to provide information for scheduling an uplink (UL) data packet on a packet data network (PDN) connection of at least one radio bearer by a wireless communication unit. The network element comprises logic for deriving at least one scheduling priority parameter assigned to at least one uplink radio bearer, wherein the at least one scheduling priority parameter is based on at least one characteristic of the PDN connection that the radio bearer belongs to. The network element further comprises a transmitter, operably coupled to the logic for deriving, and arranged to transmit the scheduling parameter to the wireless communication unit.

According to a fifth aspect of the invention, there is provided a method for a network element arranged to provide information for scheduling an uplink (UL) data packet on a packet data network (PDN) connection of at least one radio bearer by a wireless communication unit. The method comprises deriving at least one scheduling priority parameter assigned to at least one uplink radio bearer, wherein the at least one scheduling priority parameter is based on at least one characteristic of the PDN connection that the radio bearer belongs to; and transmitting the scheduling parameter to the wireless communication unit.

These and other aspects, features and advantages of the invention will be apparent from, and elucidated with reference to, the embodiments described hereinafter.

BRIEF DESCRIPTION OF THE DRAWINGS

FIG. 1 illustrates a known 3GPP system using AMBR.

FIG. 2 illustrates a known AMBR policing, taking place in the Node B for the UL and GW for the DL traffic.

Embodiments of the invention will be described, by way of example only, with reference to the accompanying drawings, in which:

FIG. 3 illustrates a system architecture adapted in accordance with embodiments of the invention.

FIG. 4 illustrates an attach procedure and radio bearer establishment of an EPS/LTE system in accordance with embodiments of the invention.

Figure 5:
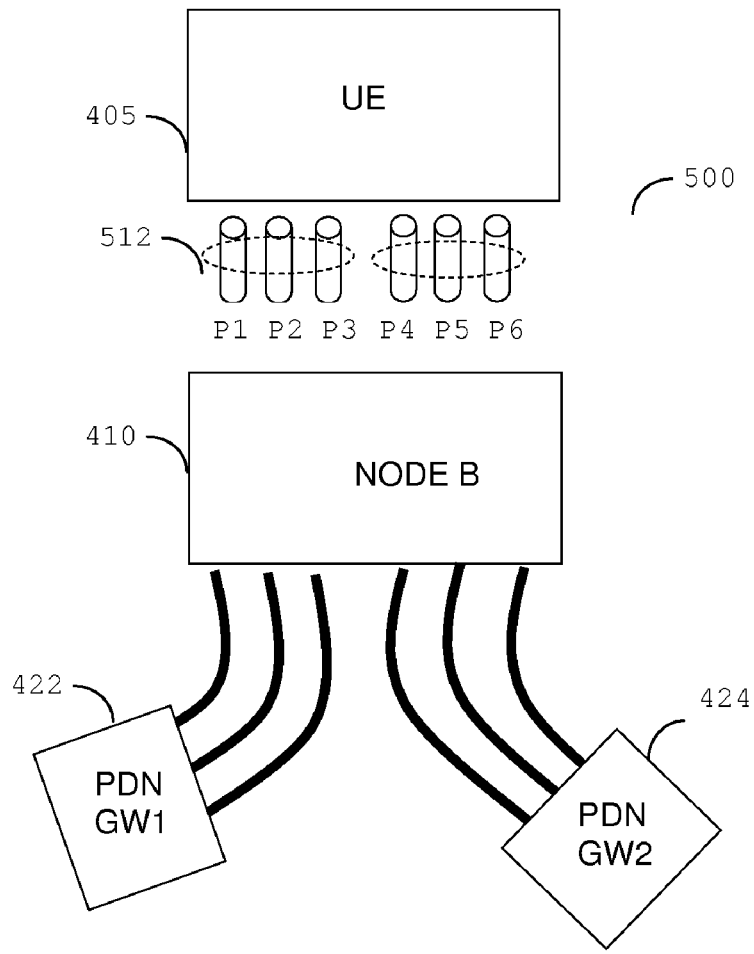

FIG. 5 illustrates a scheduling mechanism for the group of radio bearers corresponding to two UE-PDN connections and radio bearer priorities in accordance with embodiments of the invention.

Figure 6:
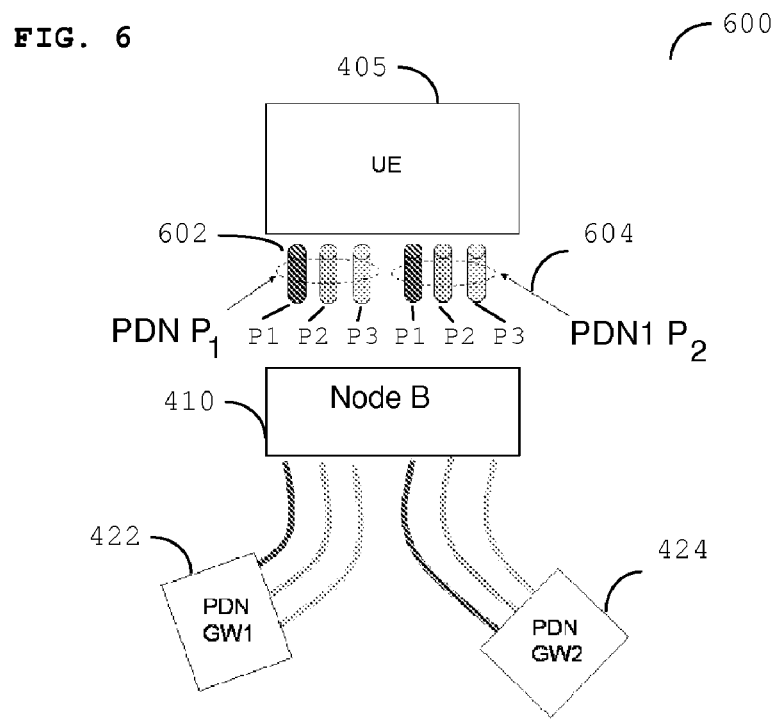

FIG. 6 illustrates a scheduling mechanism for the group of radio bearers corresponding to two UE-PDN connections in accordance with embodiments of the invention.

Figure 7:
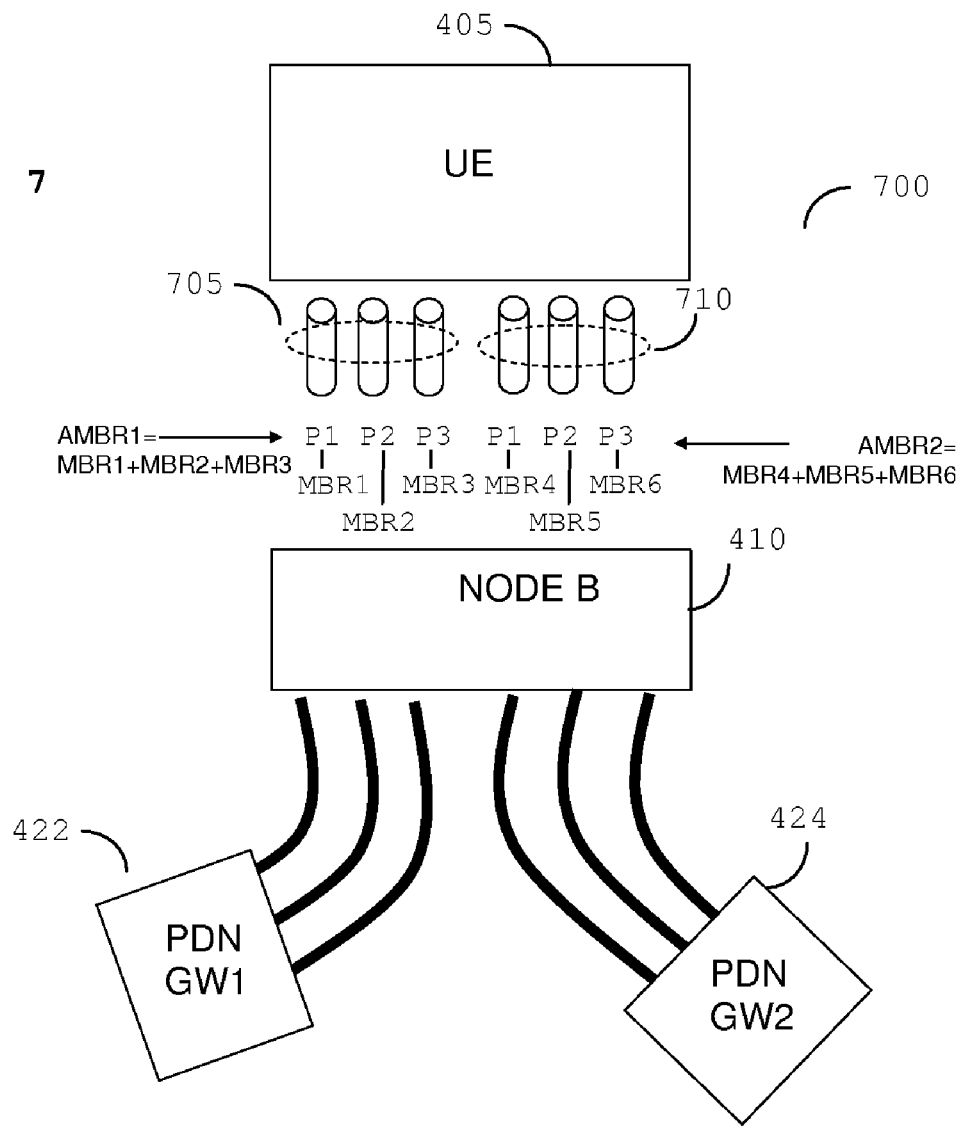

FIG. 7 illustrates MBR assigned to each radio bearer corresponding to the AMBR of the UE-PDN connection and the absolute priority of this radio bearer in accordance with embodiments of the invention.

Figure 8:
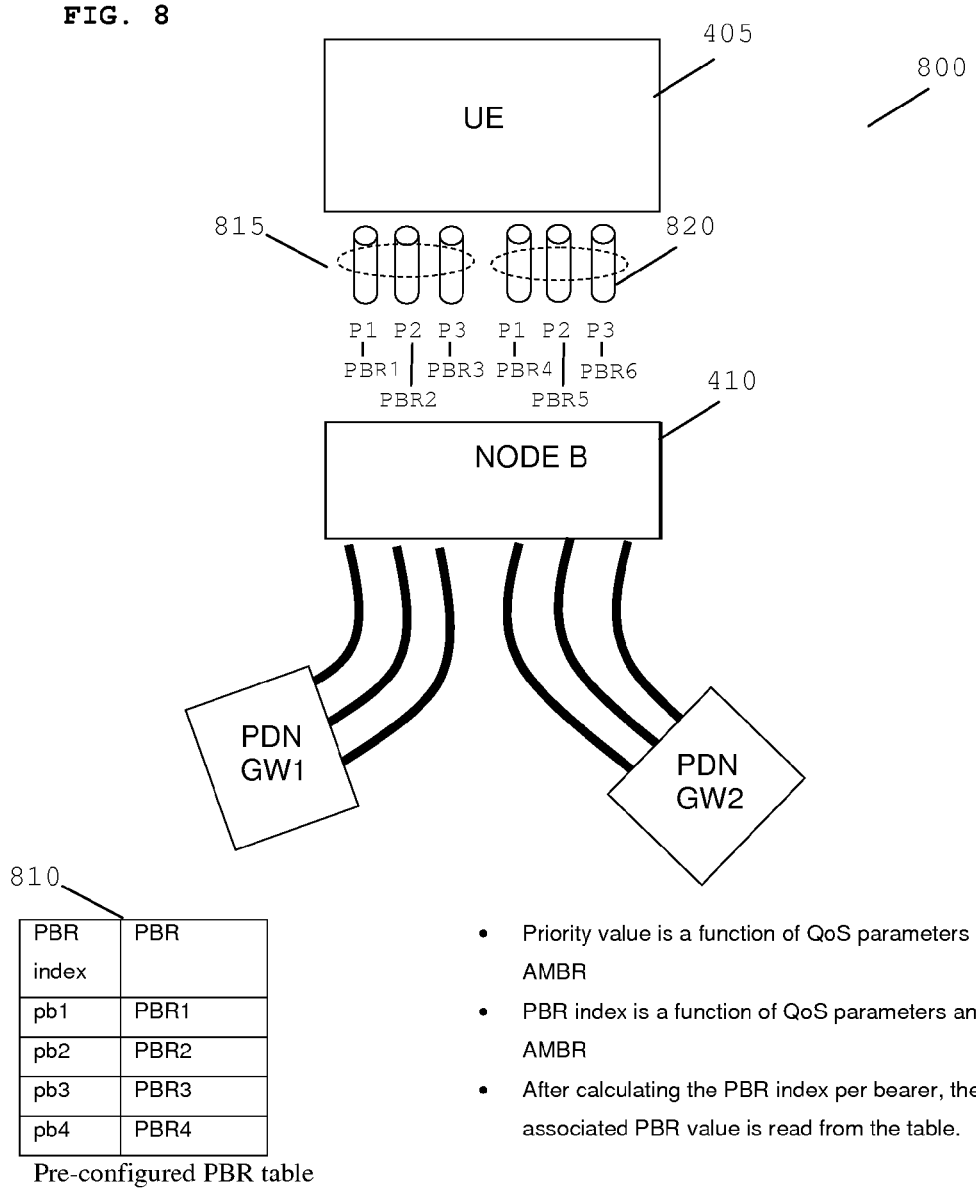

FIG. 8 illustrates an uplink rate control weighting parameter assigned to each radio bearer corresponding to the AMBR of the UE-PDN connection in accordance with embodiments of the invention.

Figure 9:
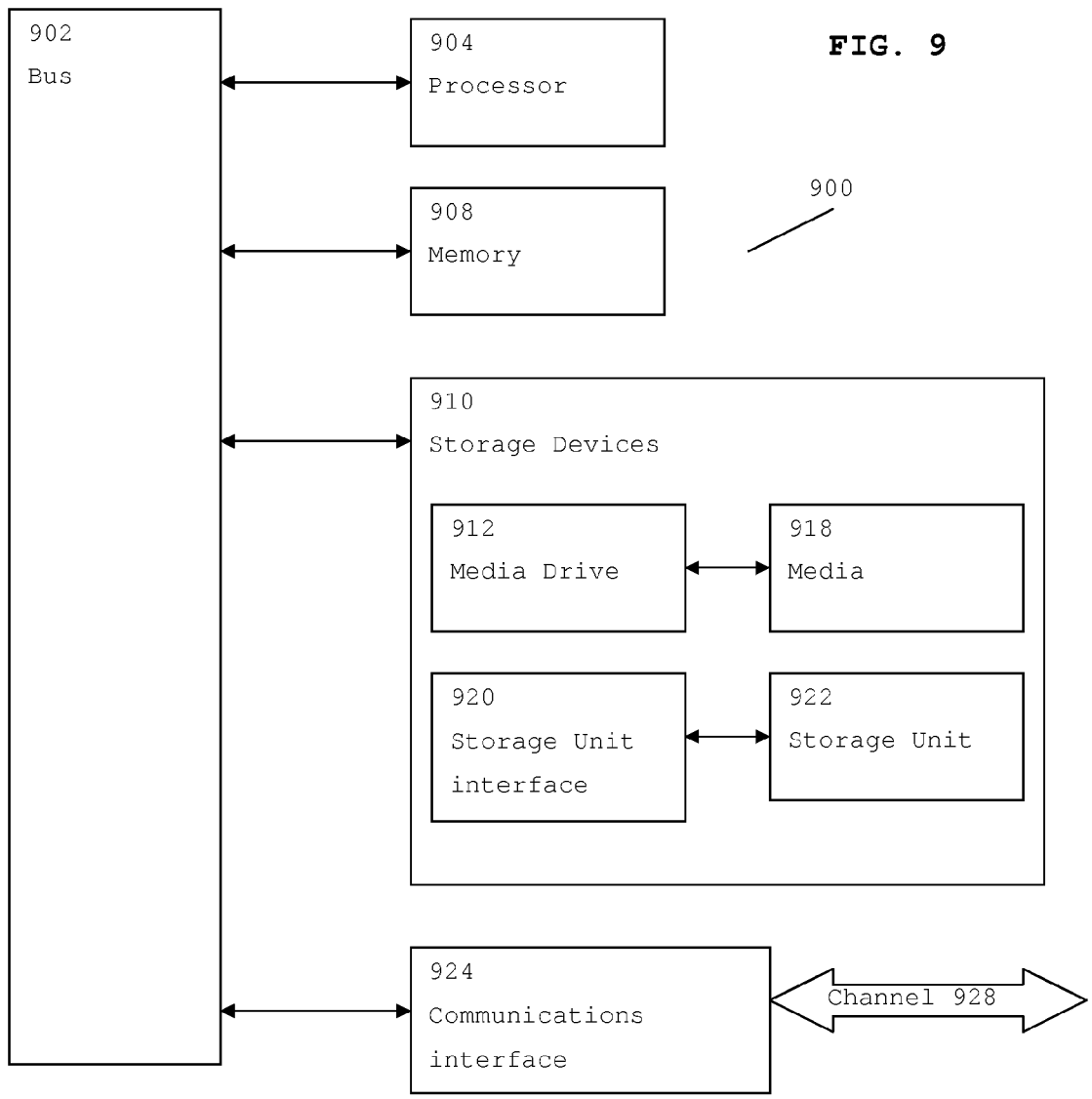

FIG. 9 illustrates a typical computing system that may be employed to implement processing functionality in accordance with embodiments of the invention.

DETAILED DESCRIPTION OF EMBODIMENTS OF THE INVENTION

The following description focuses on embodiments of the invention applicable to an Evolved-UMTS (Universal Mobile Telecommunication System) cellular communication system and in particular to an Evolved Packet System (EPS) core network (CN) architecture within a $3^{rd}$ generation partnership project (3GPP) system. However, it will be appreciated that the invention is not limited to this particular cellular communication system, but may be applied to other cellular communication systems.

As a precursor to describing embodiments of the invention, a signalling mechanism may be used to obtain the AMBR parameter with its associated PDN connection identifier from a static subscriber database when the communication endpoint bootstraps and attaches initially in the network. Furthermore, the AMBR may be communicated with its associated PDN connection identifier to the network element that is responsible to police and enforce the AMBR per PDN connection.

In addition, in some embodiments, a network element may enforce the AMBR for a plurality of PDN connections that the communication endpoint, for example a UE, may have in place. Thus, in some embodiments, the network element is configured to be responsible to serve multiple communication endpoints in an environment of dynamically changing resources.

Referring now to FIG. 3, a wireless communication system 300 is shown in outline, in accordance with embodiments of the invention. In one embodiment, the wireless communication system 300 is compliant with, and contains network elements capable of operating over, a universal mobile telecommunication system (UMTS) air-interface. In particular, embodiments such as those illustrated in FIG. 3 relate to a system's architecture for an Evolved-UTRAN (E-UTRAN) wireless communication system, which is currently under discussion in 3GPP. This is also referred to as Long Term Evolution (LTE).

The architecture consists of radio access network (RAN) and core network (CN) elements, with the core network 304 being coupled to external networks 302 named Packet Data Networks (PDNs), such as the Internet or a corporate network. The main component of the RAN is an eNodeB (an evolved NodeB) 310, 320, which is connected to the CN 304 via the 'S1' interface and to the UEs 320 via an 'Uu' interface. The eNodeB 310, 320 controls and manages the radio resource related functions. The series of Node Bs 310, 320 typically perform lower layer processing for the network, performing functions such as Medium Access Control (MAC), formatting blocks of data for transmission and physically transmitting transport blocks to UEs 325. In addition to these functions that the NodeB's usually perform, the adapted Node Bs 310 scheduler logical element is additionally arranged to interact with the logical element of the PEF that is assigned to enforce the UL AMBR for non-GBR bearers that belong to a certain UE-PDN connection, in order to provide a sub-set of functions that the 3GPP PCEF located in the PDN GW 305 implements in the downlink (DL) such rate limiting. An additional limitation exists in that the rate limiting function of a PEF logical element in the UL has to meet a certain performance, and that it cannot simply 'pass-through' the traffic over-the-air and then drop it. Hence, the adapted schedulers in the Node Bs 310 are arranged to derive adequate scheduling parameters that will be communicated to the UE 320 based on the AMBR that has to be enforced by the logical element of a Policy Enforcement Function (PEF) located in the Node-B 310, in order to support this operation.

The CN 304 has three main components: serving GW 306, the PDN GW (PGW) 305 and mobility management entity (MME) 308. The serving-GW 306 controls the U-plane (user-plane) communication. The PDN-GW 305 controls access to the appropriate external network (e.g. PDN). In addition to this operation, in one embodiment, the PDN-GW 305 is arranged to police the DL AMBR for a number of non-GBR bearers that serve this particular UE-PDN connection. The MME 308 controls the c-plane (control plane) communication, where the user mobility, paging initiation for idle mode UEs, bearer establishment, and QoS support for the default bearer are handled by the MME 308. In addition to these operations, in one embodiment, the MME 308 is arranged to derive, normally using database query mechanisms to the Home Subscriber Server (HSS) 330 with protocols, such as DIAMETER (as in RFC3588) or RADIUS (as in RFC2865), the UL and DL AMBR values that apply to each PDN connection that the UE 320 is allowed to establish.

The UL and DL AMBR values are based on the UE's subscription profile and provisioning information that may be stored in a static database, such as an HSS 330 that may contain the user credentials that are used for the UE's authentication, user class in terms of tier of service and other static information. The UL AMBR value is communicated to the logical element of the PEF in the Node B 310 that is assigned to enforce the UL AMBR and the DL AMBR value is communicated to the 3GPP PCEF in the PDN GW 305 that the UE 320 initially attaches to.

E-UTRAN RAN is based on OFDMA (orthogonal frequency division multiple access) in downlink (DL) and SC-FDMA (single carrier frequency division multiple access) in uplink (UL). the further information of radio frame formats and physical layer configuration used in E-UTRAN can be found in TS 36.211(3GPP TS 36.211 v.1.1.1 (2007-05), '3GPP Technical specification group radio access network, physical channels and modulation (release 8)'.

The Node-Bs 310 are connected wirelessly to the UEs 325. Each Node-B contains one or more transceiver units 312, 322 operably coupled to respective signal processing logic 314, 324. Similarly, each of the UEs comprise transceiver unit 327 operably coupled to signal processing logic 329 (with one UE illustrated in such detail for clarity purposes only) and communicate with the Node B supporting communication in their respective location area. The system comprises many other UEs and Node-Bs, which for clarity purposes are not shown.

The signalling of the AMBR value may be signalled, per UE-PDN connection, together with a PDN gateway identifier from the CN to the Radio access network. The signalling for the end-to-end bearer establishment in such a wireless communication system may be either UE-initiated or Network-initiated. In this manner, the AMBR is adequately communicated to the UE for the available PDN connections that the UE has in place. This signalling technique is described in co-pending UK patent application 0716210.0, filed by the same Applicant on 20 Aug. 2007, and is incorporated herein by reference.

In such a signaling mechanism, the Node-B establishes the relevant radio bearer(s), subject to the information provided. In a case of an UE-initiated establishment, this leads to the establishment of only radio bearers corresponding to this particular UE-PDN connection. In a case of a network-initiated establishment, the Node-B at this stage establishes all the radio bearers to serve all the required PDN connections for the UE. The mechanism employed by the Node-B to handle the information provided, in order to determine scheduling parameters is as described below with reference to FIG. 4.

Referring now to FIG. 4, an example of AMBR signalling in the core network of an E-UTRAN, as a precursor to describing the scheduling aspects of embodiments of the invention, is illustrated. As defined in 3GPP TS 23.401, 'GPRS enhancements for E-UTRAN access'; Release 8, the AMBR associated with each PDN that the UE 405 has access to is stored in the home subscriber server (HSS) (equivalent to the home location register in earlier GSM-based systems) based on subscriber information. The AMBR is retrieved by the MME 415 as part of an 'Attach' procedure.

As an example, the following information may be stored in the HSS for each UE, as illustrated in Table 1 below:

TABLE 1

| UE (imsi = xxxxxyyyyyzzzzz) | |
|---|---|
| APN1 | Ul_ambr1, Dl_ambr2 |
| APN2 | Ul_ambr2, Dl_ambr2 |
| APN3 | Ul_ambr3, Dl_ambr3 |

This information is retrieved in the MME 415 after the UE attaches, and should be provided in the PDN GW 422 and eNodeB 410 for DL and UL policing respectively.

In this regard, the DL value of the AMBR may be sent from the MME 415 to the PDN GW 422 as part of a 'Create Default bearer message', as shown in step 550, in order for the PDN GW 422 to be able to police the AMBR in the DL. The UL AMBR may also be sent from the MME 415 to the eNodeB 410 as part of an 'Attach Accept' message, as illustrated in step 555.

Thus, the following additional signalling is proposed to the 'Attach' procedure of EPS/LTE as described in 3GPP TS 23.401, 'GPRS enhancements for E-UTRAN access'; Release 8, to achieve the aforementioned communications. The technique for handling subsequent subscriber data messages and establishment messages are described in co-pending UK patent application 0716210.0, filed by the same Applicant on 20 Aug. 2007, and is incorporated herein by reference.

In the signalling mechanism of FIG. 4, the PDN address assigned to the UE 405 is included in this message. The APN of the PDN GW 422, to which the UE 405 is connected, may also be included in this message. The new MME 412 sends the UL AMBR to the eNodeB 410.

In step 560, the eNodeB 410 sends a Radio Bearer Establishment Request to the UE 405 and the Attach Accept message (S-TMSI, PDN address, TA List, APN) 555 will be sent along to the UE 405.

Thereafter, messages 565-590 are sent as described in section 5.3.2 of 3GPP TS 23.401, 'GPRS enhancements for E-UTRAN access'; Release 8.

AMBR Handling in the Radio Access Network, for Example the Node-B

In accordance with one embodiment of the invention, the interaction between the UE 325, Node-B 310, MME 308, GW 305, 306 and AAA have also been adapted to support improved usage of AMBR information signalled between elements. In particular, apparatus and methods are proposed to allow the radio access network (RAN) to take into account the information provided from the Core Network (CN), to be able to prioritise the scheduling of traffic belonging to a particular PDN connection subject to the AMBR. In one embodiment of the invention, apparatus and methods are proposed to enforce the AMBR in the Node-B 310.

The proposed mechanism configures the scheduler in the Node-B 310 to assign appropriate scheduling priority parameter values to the radio bearers. Notably, in accordance with one embodiment of the invention, the Node-B 310 assigns a radio bearer priority level to one or more radio bearers in order to reflect the enforcement of the UL AMBR applied to one, or the entire set, of radio bearers corresponding to a UE-PDN connection that the PEF has to perform. In an enhanced embodiment of the invention, the Node-B 310 may assign further scheduling parameters, in addition to the radio bearer priority level, to the one or more radio bearers, for example in a 3GPP system by also assigning one or more of: uplink rate control weighting parameter, at least one absolute priority value, MBR. As used herein, the term 'uplink rate control weighting parameter' encompasses, for example, a bit rate or weighting parameter value assigned to a radio bearer, which may assist the user equipment to a fair scheduling of granted radio resources among multiple radio bearers.

In a case where a UE 405 has multiple PDN connections, PEF logic in the Node-B 410 needs to police UL traffic that belong to each PDN connection separately. Therefore, the PEF logic in the Node-B 410 should have been informed of any association between one or more radio access bearers and the PDN connection during the radio bearer establishment.

Further, although embodiments of the invention are described with reference to the MME obtaining at least one aggregate maximum bit rate (AMBR) value and communicating this to the Node-B, with the Node-B generating an association of the AMBR with the at least one PDN Identifier, in alternative embodiments it may be possible for the Node-B to obtain and to transmit the AMBR value directly to the wireless communication unit (for example the UE). In this scenario, the UE will be responsible for the policing of the UL AMBR for the number of radio bearers that belong to a specific UE-PDN connection. In addition to the AMBR, in this scenario, the information of the PDN identifier may be communicated by the Node-B to the UE upon the radio bearer establishment. The inventors though recognise that this scenario may have a limitation that the policing of the AMBR that is associated with the management of radio resources will be relayed solely to the UE that is traditionally considered as an 'un-trusted' entity in similar communication systems.

In the context of the invention, the terms related to priorities may be considered as encompassing the following. Radio bearer priority may be considered as encompassing a priority associated with a radio bearer, which is assigned by the network and signalled to the UE during the radio bearer configuration. Absolute priority may be considered as encompassing a priority associated with a PDN connection that is assigned by the network based on at least one characteristic of the PDN connection and may be signalled to the UE during an establishment of at least one PDN connection, or during a radio bearer configuration. User transmission priority may be considered as encompassing a priority value associated with a radio bearer that is derived by the UE, based on at least one scheduling priority parameter signalled by the network. The UE is then able to schedule the radio bearers for UL transmission based on the user transmission priority.

In accordance with embodiments of the invention, four mechanisms are described for signalling the UE of the association between the PDN connections and the radio bearers and additionally associating the AMBR with the one or more PDN connection(s), such that the UE may schedule UL resources accordingly:

(i) Based on radio bearer priority
(ii) Based on radio bearer priority and absolute priority per PDN connection (as illustrated in FIG. 6);
(iii) Based on radio bearer priority and MBR per radio bearer (as illustrated in FIG. 7); and
(iv) Based on radio bearer priority and uplink rate control weighting parameter per radio bearer (as illustrated in FIG. 8).

AMBR Handling in the NodeB Based on Radio Bearer Priority

Referring now to FIG. 5, a possible mechanism 500 to perform scheduling in the NodeB is illustrated. The mechanism to communicate at least one scheduling parameter is based on the at least one AMBR value(s) that, in one embodiment, has been communicated as part of the bearer establishment. Here, the radio bearer priority value is assigned taking into account the QoS information of the radio bearer, as well as the AMBR of the PDN connection to which the radio bearer belongs. Thereafter scheduling is performed by the UE 405 based on a determined user transmission priority value, based on the assigned radio bearer priority value and a communicated AMBR value.

For example let us again assume that two radio bearers, R1 and R2, are used having the same QoS parameters but belonging to two PDN connections with different AMBR values, AMBR-1 and AMBR-2 respectively. Let us further assume that AMBR-1<AMBR-2. If the radio bearer priority is assigned purely based on QoS information, both radio bearers should be assigned with the same radio bearer priority value. However, if we also take into account the associated AMBR values, the two radio bearers, R1 and R2, are assigned with radio bearer priority values p1 and p2 respectively, where p1<p2.

At the UE, the user transmission priority values, U1 and U2 are determined for radio bearer R1 and R2 based on p1 and p2 such as U1=p1, U2=p2.

AMBR Handling in the NodeB Based on Absolute Priority Per PDN Connection

Referring now to FIG. 6, a possible mechanism to perform scheduling in the NodeB is illustrated. The mechanism to communicate at least one scheduling parameter is based on the AMBR values that have been communicated as part of the bearer establishment. The Identifier (ID) for PDN GW 422 or 424 (for example APN in 3GPP) may be signalled to the UE 405 together with the at least one assigned scheduling parameter that comprises, or is based on, a radio bearer priority level, which is assigned based on QoS information of the radio bearer.

Furthermore, an absolute priority may also be signalled to the UE, for the UE to apply to the group of bearers that are related to a specific PDN connection. In this case, the radio bearer scheduling is performed based on a user transmission priority value determined by the UE based on both the radio bearer priority of the radio bearer and the absolute priority assigned to the group of radio bearers belonging to the PDN connection.

First, for example, let us assume that each radio bearer is assigned with a radio bearer priority (for example p1, p2, p3) corresponding to the QoS information of the radio bearer. Secondly, let us assume that the PDN connection to which the radio bearer belongs is provided with an absolute priority value ($P_i$ 505 $P_z$ 510) where 'P' is as identified in FIG. 6, and 'p's represent the radio bearer priority.

Thus, the UE 405 may schedule the radio bearers by considering the absolute priority value of the PDN connection and the radio bearer priority of the radio bearer.

For example let us assume that two radio bearers, R1 and R2 are used, having the same QoS parameters but belonging to two PDN with different AMBR values, AMBR-1 and AMBR-2 respectively. Therefore, R1 and R2 may be assigned with the same radio bearer priority p1 based on the QoS information. However, PDNs are associated with a different absolute priority, P1 and P2 respectively, where P1 corresponds to the PDN with AMBR-1 and P2 corresponds to the PDN with AMBR-2.

Let us also assume that AMBR-1<AMBR-2, hence absolute priority P1<P2. In this example, the radio bearers are scheduled taking into account the user transmission priority U1 and U2 of the radio bearers, which are determined based on the radio bearer priority, (p1) and the absolute priority value of PDNs (P1 and P2). As P1<P2, the radio bearer R2 may take priority over radio bearer R1, thus U1<U2.

AMBR Handling in the NodeB Based on MBR

Referring now to FIG. 7, the Identifier (ID) for PDN GW 422 or 424 (for example access point node (APN) in 3GPP) is signalled to the UE 405, where a separate Maximum Bit Rate (MBR) may also be optionally allocated to each separate radio bearer, in addition to the radio bearer priority value, for example during the radio bearer configuration. In one embodiment, the radio bearer priority may be assigned based on the QoS information of the radio bearer.

Policing of the MBR is performed at the UE 405. This means that if a radio bearer exceeds the MBR value, the data will be dropped or delayed at the UE 405. The computation of the MBR for non-GBR traffic may be based on the AMBR of the PDN connection 705, 710 in addition to other relevant QoS parameters. For example, if only one radio bearer is established for a given PDN connection, the MBR of the radio bearer equals the AMBR. If more than one radio bearer is established per the PDN GW, then the MBR may be scaled to reflect the priorities of the individual radio bearers.

For example, let us assume that two radio bearers with radio bearer priority values p1 and p2 are established. The MBR value of these two radio bearers may be assigned respectively as:

$$AMBR*p1/(p1+p2); \text{ and}$$

$$AMBR*p2/(p1+p2).$$

In either case, the sum of the MBR values assigned to a number of radio bearers corresponding to the same PDN connection shall be set to not exceed the AMBR for this UE-PDN connection.

In this embodiment, the UE 405 may schedule the radio bearers by considering the radio bearer priority of the radio bearer and the MBR of the radio bearer.

For example, in this embodiment, let us assume that two radio bearers, R1 and R2, are used having the same QoS parameters. Hence, the radio bearers are assigned with the same p1 radio bearer priority value. However, let us further assume that the two radio bearers, R1 and R2, are assigned with different MBR values, MBR-1 and MBR-2 respectively. If we assume that MBR-1<MBR-2, the radio bearers are scheduled taking into account both the radio bearer priority and the MBR values. Thus, the second radio bearer R2 may be scheduled more often than that of the first radio bearer R1, if data is available for both radio bearers. In this embodiment, the UE determines the user transmission priority values for the radio bearers (U1 and U2) based on both radio bearer priority and MBR values, such that U1<U2.

In one embodiment, the UE uplink rate control parameters may be able to be amended to reflect a result of the UL traffic policing at the Node-B 410. For example, if traffic belonging to a particular PDN connection is exceeding the AMBR value, the traffic to this particular PDN connection may be 'placed on hold', whilst delivering other UL traffic from other UEs or other PDN connections of the same UE 405. Assuming that the UL grant is performed on a per UE basis, the grant signalling alone may be inadequate to serve a scenario that the UE has multiple ongoing PDN connections, each with a different AMBR.

As the AMBR is therefore transparent to the UE 405, every radio bearer under consideration may be signalled to the UE 405 separately, in a case where the sum of traffic served by the radio bearers belonging to the PDN connection exceeds the AMBR. The signalling overhead incurred from this procedure may be significant in case there are many radio bearers that need to be controlled as a result of traffic policing. Thus, in one embodiment, the signalling may be optimised amongst the bundle of radio bearers being considered.

In one example, the allocated MBR may be signalled to the UE with the radio bearer configuration. Thus, the release and addition of bearers may also require modifying the already assigned MBR value(s). In one embodiment, a group that is signalling to all of the radio bearers corresponding to the same PDN connection may reduce the signalling overhead.

In one embodiment, policing of the MBR may be performed at the UE. This means that if a radio bearer exceeds the MBR value, the data will be advantageously dropped or delayed at the UE. The computation of the MBR for non-GBR traffic may then be based on the AMBR of the PDN connection.

AMBR Handling in the NodeB Based on Uplink Rate Control Weighting Parameter

Referring now to FIG. 8, a schematic diagram 800 illustrates uplink rate control weighting parameter and radio bearer priority value as being a function of both QoS and AMBR in accordance with embodiments of the invention. In an EPS/LTE system, the uplink rate control weighting parameter and radio bearer priority value 815, 820 may be assigned to each radio bearer and signalled by the eNodeB 410 to the UE 405 with the radio bearer configuration.

As mentioned previously, the AMBR value (in addition to the QoS information) is also considered as a parameter in the computation of the radio bearer priority value and uplink rate control weighting parameter assignment. The uplink rate control weighting parameter and radio bearer priority value may be derived from the QoS parameters that are communicated to the Node-B (i.e. in a form of a label) as well as the communicated AMBR, as shown in FIG. 8. As will be appreciated by a skilled artisan, the terms 'value' and 'level' have been used interchangeably throughout the specification.

In an EPS/LTE system, a set of uplink rate control weighting parameter values may be pre-configured at the eNodeB 410. For example, this set of uplink rate control weighting parameter values may be configured in a tabular form 810 as shown in FIG. 8. In this manner, the eNodeB 410 calculates the table index as a function of QoS parameters of the bearer and AMBR signalled to the eNodeB. The uplink rate control weighting parameter value associated with the calculated table index is assigned to the corresponding radio bearer and signalled to the UE 405 with radio bearer configuration by the eNodeB 410.

For example, let us assume that a first bearer (B1) belonging to PDN-1 and a second bearer (B2) belonging to PDN-2 may have the same QoS parameters. Let us further assume that AMBR-1, associated with PDN-1, is higher than AMBR-2 associated with PDN-2 (i.e. AMBR-1<AMBR-2). If we assume that a first radio bearer priority level P1 and uplink rate control weighting parameter-1 are respectively the radio bearer priority level and uplink rate control weighting parameter values associated with B1, and a second radio bearer priority level P2 and uplink rate control weighting parameter-2 are respectively the radio bearer priority level and uplink rate control weighting parameter value associated with B2, the AMBR based priority allocation results in P1<P2 and uplink rate control weighting parameter-1<uplink rate control weighting parameter-2.

In this embodiment, the UE determines the user transmission priority of the bearers based on both radio bearer priority and uplink rate control weighting parameter. If U1 and U2 are assumed to be user transmission priority of radio bearer-1 and radio bearer-2 respectively, the determined user transmission priority is such that U1<U2.

As a result of the uplink rate control weighting parameter value and the radio bearer priority level being calculated based on the QoS parameters of the radio bearer and AMBR values of the PDN connection, the release and addition of individual radio bearers may also require a consequent modifying of the already assigned uplink rate control weighting parameter and priority values. Thus, the signalling modification to each individual radio bearer may incur large signalling overhead. Thus, in an enhanced embodiment, the signalling may be optimised amongst the bundling of radio bearers being considered.

Although embodiments of the invention have been described with reference to a 3GPP wireless communication system, for example an EPS/LTE 3GPP wireless communication system, the inventive concept may be applied to other wireless communication systems, such as WiMAX.

While the invention has been described in terms of particular embodiments and illustrative figures, those of ordinary skill in the art will recognize that the invention is not limited to the embodiments or figures described. Although embodiments of the present invention are described, in some instances, using UMTS terminology, those skilled in the art will recognize that such terms are also used in a generic sense herein, and that the present invention is not limited to such systems.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term 'logic' herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

FIG. 9 illustrates a typical computing system 900 that may be employed to implement processing functionality in embodiments of the invention. Computing systems of this type may be used in the UE (which may be an integrated device, such as a mobile phone or a USB/PCMCIA modem), or NodeB (in particular, the scheduler of the NodeB), core network elements, such as the GGSN, and RNCs, for example. Those skilled in the relevant art will also recognize how to implement the invention using other computer systems or architectures. Computing system 900 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 900 can include one or more processors, such as a processor 904. Processor 904 can be implemented using a general or special purpose processing engine such as, for example, a microprocessor, microcontroller or other control logic. In this example, processor 904 is connected to a bus 902 or other communications medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory (ROM) or other static storage device coupled to bus 902 for storing static information and instructions for processor 904.

The computing system 900 may also include information storage system 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 918 may include, for example, a hard disk, floppy disk, magnetic tape, optical disk, CD or DVD, or other fixed or removable medium that is read by and written to by media drive 914. As these examples illustrate, the storage media 918 may include a computer-readable storage medium having stored therein particular computer software or data.

In alternative embodiments, information storage system 910 may include other similar components for allowing computer programs or other instructions or data to be loaded into computing system 900. Such components may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a universal serial bus (USB) port), a PCMCIA slot and card, etc. Software and data transferred via communications interface 924 are in the form of signals which can be electronic, electromagnetic, and optical or other signals capable of being received by communications interface 924. These signals are provided to communications interface 924 via a channel 928. This channel 928 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 908, storage device 918, or storage unit 922. These and other forms of computer-readable media may store one or more instructions for use by processor 904, to cause the processor to perform specified operations. Such instructions, generally referred to as 'computer program code' (which may be grouped in the form of computer programs or other groupings), when executed, enable the computing system 900 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 900 using, for example, removable storage drive 914, drive 912 or communications interface 924. The control logic (in this example, software instructions or computer program code), when executed by the processor 904, causes the processor 904 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

We claim:

1. A method of scheduling an uplink (UL) data packet on a packet data network (PDN) connection of at least one radio bearer by a wireless communication unit, the method comprising:

receiving, by the wireless communication unit, a signalling message comprising at least one scheduling priority parameter assigned to at least one uplink radio bearer, wherein the at least one scheduling priority parameter is based on an aggregate maximum bit rate to be enforced for the PDN connection that the radio bearer belongs to;

determining, from the at least one scheduling priority parameter, at least one user transmission priority level associated with at least one PDN connection of at least one radio bearer; and scheduling at least one uplink data packet transmission based on the at least one user transmission priority level.

2. The method of claim 1 wherein the at least one scheduling priority parameter comprises at least one of:
at least one radio bearer priority:
at least one uplink rate control weighting parameter;
at least one maximum bit rate (MBR); or
at least one absolute priority value.

3. The method of claim 2 wherein the at least one absolute priority value is assigned to at least one of:
a PDN connection; or
an aggregate maximum bit rate (AMBR) value.

4. The method of claim 2 wherein the at least one user transmission priority level is based on both the at least one radio bearer priority level and the at least one absolute priority value.

5. The method of claim 2 further comprising:
associating at least one uplink rate control weighting parameter with the at least one radio bearer of the wireless communication unit based on at least one AMBR value associated with the at least one PDN connection.

6. The method of claim 3 further comprising receiving at least one AMBR value as a first scheduling parameter to the wireless communication unit before receiving at least one further scheduling parameter.

7. The method of claim 1, further comprising receiving the scheduling priority parameter as part of an establishment of the at least one PDN connection of the wireless communication unit.

8. The method of claim 1, further comprising receiving the scheduling priority parameter as part of a radio bearer establishment of the at least one PDN connection of the wireless communication unit.

9. The method of claim 1 wherein the at least one user transmission priority level is associated with a plurality of individual radio bearers corresponding to the at least one PDN connection.

10. The method of claim 1, when applied to a 3.sup.rd Generation Partnership Project (3GPP) cellular communication system.

11. The method of claim 10, when applied to a 3GPP Evolved Packet System (EPS) architecture.

12. The method of claim 10, when applied to a 3GPP Long Term Evolution (LTE) air interface architecture.

13. The method of claim 1, when applied to a WiMAX cellular communication system.

14. A wireless communication unit for scheduling an uplink (UL) data packet on a packet data network (PDN) connection of at least one radio bearer in a wireless communication system, the wireless communication unit comprising:
a receiver for receiving a signalling message comprising at least one scheduling priority parameter assigned to at least one uplink radio bearer, wherein the at least one scheduling priority parameter is based on an aggregate maximum bit rate to be enforced for the PDN connection that the radio bearer belongs to;
logic for determining from the at least one scheduling priority parameter at least one user transmission priority level associated with at least one PDN connection of at least one radio bearer; and
scheduler logic for scheduling, by the wireless communication unit, at least one uplink data packet transmission in response to the at least one user transmission priority level.

15. A non-transitory computer memory comprising program code for scheduling an uplink (UL) data packet on a packet data network (PDN) connection of at least one radio bearer in a wireless communication system, the program code for:
receiving a signalling message comprising at least one scheduling priority parameter assigned to at least one uplink radio bearer, wherein the at least one scheduling priority parameter is based on an aggregate maximum bit rate to be enforced for the PDN connection that the radio bearer belongs to;
determining from the at least one scheduling priority parameter at least one user transmission priority level associated with at least one PDN connection of at least one radio bearer; and
scheduling at least one uplink data packet transmission in response to the at least one user transmission priority level.

16. A network element arranged to provide information for scheduling an uplink (UL) data packet on a packet data network (PDN) connection of at least one radio bearer by a wireless communication unit, the network element comprising:
logic for deriving at least one scheduling priority parameter assigned to at least one uplink radio bearer, wherein the at least one scheduling priority parameter is based on an aggregate maximum bit rate to be enforced for the PDN connection that the radio bearer belongs to; and
a transmitter, operably coupled to the logic for deriving, wherein the transmitter is operable to transmit the scheduling parameter to the wireless communication unit.

17. The network element of claim 16 wherein the scheduling priority parameter comprises at least one of:
at least one radio bearer priority:
at least one uplink rate control weighting parameter;
at least one maximum bit rate (MBR); or
at least one absolute priority value.

18. The network element of claim 17 wherein the at least one absolute priority value is assigned to at least one of:
a PDN connection; or
an aggregate maximum bit rate (AMBR) value.

19. The network element of claim 17 further comprising:
logic for deriving a maximum bit rate (MBR) value per radio bearer from an AMBR value that corresponds to a PDN connection that the radio bearer serves.

20. A method for a network element arranged to provide information for scheduling an uplink (UL) data packet on a packet data network (PDN) connection of at least one radio bearer by a wireless communication unit, the method comprising:
deriving at least one scheduling priority parameter assigned to at least one uplink radio bearer, wherein the at least one scheduling priority parameter is based on an aggregate maximum bit rate to be enforced for the PDN connection that the radio bearer belongs to; and
transmitting the scheduling parameter to the wireless communication unit.

* * * * *

UNITED STATES PATENT AND TRADEMARK OFFICE
CERTIFICATE OF CORRECTION

Page 1 of 1

PATENT NO.         : 8,064,382 B2
APPLICATION NO.    : 11/864640
DATED              : November 22, 2011
INVENTOR(S)        : Haris Zisimopoulos et al.

It is certified that error appears in the above-identified patent and that said Letters Patent is hereby corrected as shown below:

IN THE CLAIMS:

Column 17, Claim 2, Line 3: Change "priority:" to -- priority; --

Column 17, Claim 10, Line 38: Change "3.sup.rd" to -- 3rd --

Column 18, Claim 17, Line 37: Change "priority:" to -- priority; --

Signed and Sealed this
Tenth Day of April, 2012

David J. Kappos
*Director of the United States Patent and Trademark Office*